Dec. 9, 1941.  V. J. CHAPMAN  2,265,687
CONTROL SYSTEM AND APPARATUS THEREFOR
Filed Dec. 30, 1939  2 Sheets-Sheet 1
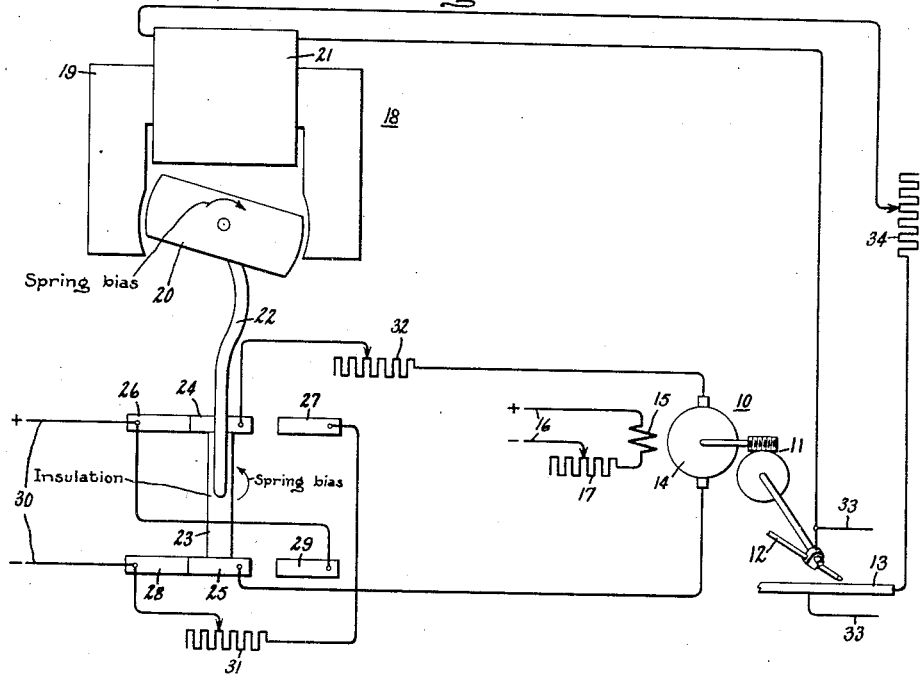
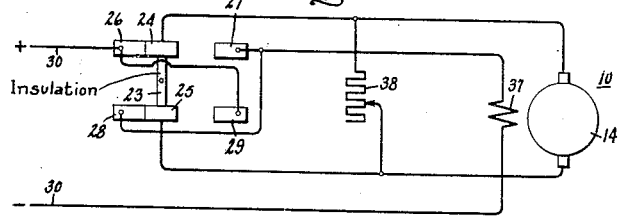
Inventor:
Verni J. Chapman,
by Harry E. Dunham
His Attorney.

Dec. 9, 1941.　　　V. J. CHAPMAN　　　2,265,687
CONTROL SYSTEM AND APPARATUS THEREFOR
Filed Dec. 30, 1939　　　2 Sheets-Sheet 2
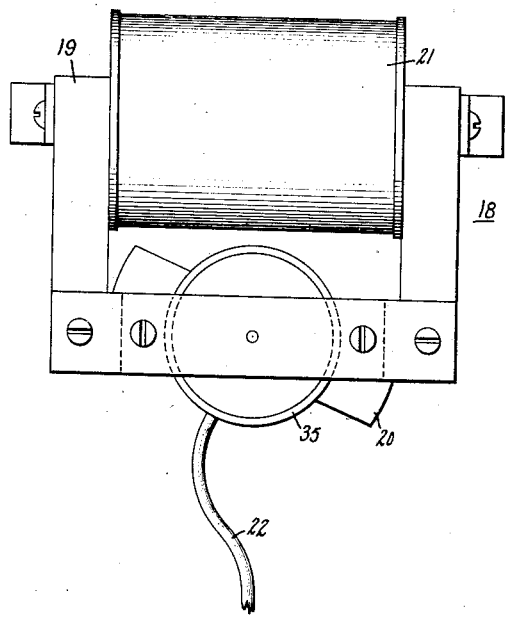
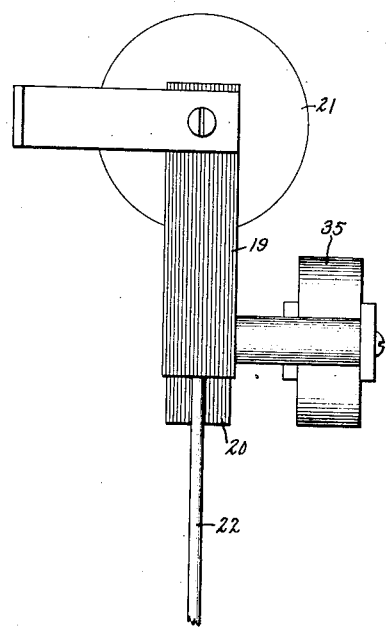
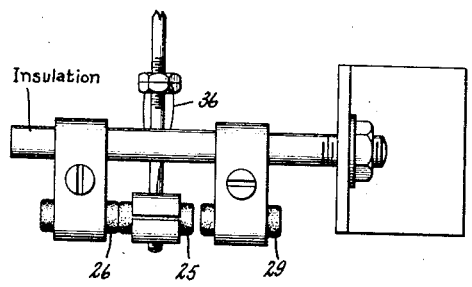
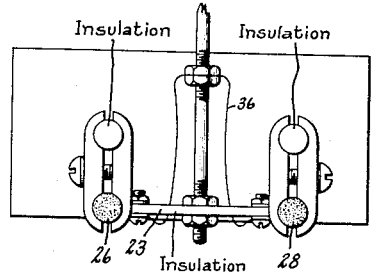
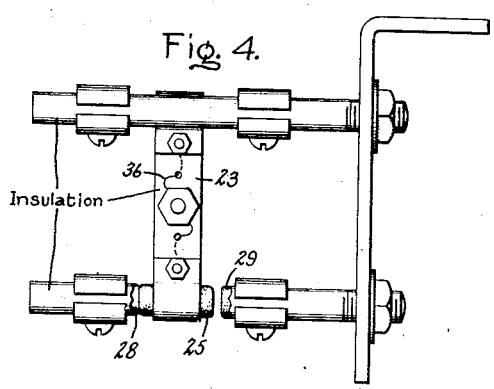
Inventor:
Verni J. Chapman,
by Harry E. Dunham
His Attorney.

Patented Dec. 9, 1941

2,265,687

UNITED STATES PATENT OFFICE 2,265,687

CONTROL SYSTEM AND APPARATUS THEREFOR

Verni J. Chapman, Schenectady, N. Y., assignor to General Electric Company, a corporation of New York Application December 30, 1939, Serial No. 311,839

3 Claims. (Cl. 172—239)

My invention relates to control systems and apparatus therefor and more particularly to a control system and apparatus employed in conjunction with small motors used in operations in which the direction of motion must be intermittently reversed.

In automatic induction voltage regulators and in automatic electric arc-welding machines as well as in other applications, a control circuit and apparatus is necessary to control a small motor which is adapted to be rotated in either direction. In automatic induction regulators, this motor controls some regulating means in response to an electrical condition of the circuit, whereby constant voltage is maintained. In automatic arc-welding apparatus, on the other hand, this motor is utilized for feeding the electrode into and out of engagement with the work to strike the arc and thereafter regulate the rate of feed toward the work to maintain the arc at substantially constant length. Many arrangements of torque motors and switches have been proposed for use in such control circuits but all of these arrangements have been complicated, requiring a large amount of apparatus which inherently increases the possibility of improper functioning of the control circuit and apparatus.

Accordingly, it is an object of my invention to provide an improved control circuit and apparatus therefor which will operate satisfactorily under all conditions and yet which will be very simple both in construction and in operation.

Another object of my invention is to provide a new and improved control circuit and apparatus for controlling the direction of rotation of a dynamo-electric machine, and for causing it to be dynamically braked in accordance with certain electrical conditions.

Still another object of my invention is to provide a new and improved combined torque motor and switch for use in electric control circuits.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 diagrammatically illustrates the control circuit and apparatus of my invention; Figs. 2 and 3 are front and side views of the combined torque motor and switch used in connection with my control circuit; Fig. 4 is a plan view of the contact structure of the switch illustrated in Figs. 2 and 3; and Fig. 5 is a schematic diagram of a modification of the control circuit illustrated in Fig. 1.

Referring now to Fig. 1 of the drawings, I have illustrated therein a specific application of my invention as applied to a control scheme for an electric arc-welding arrangement wherein an electrode is automatically fed toward and away from the work piece in accordance with the voltage conditions across the electrode and work piece. In Fig. 1, dynamo-electric machine 10, illustrated as a separately excited type of direct-current motor, is connected through gearing 11 to suitable apparatus whereby welding electrode 12 is raised or lowered from work piece 13 depending upon the direction of rotation of dynamo-electric machine 10. Dynamo-electric machine 10 is provided with an armature 14 and a field winding 15 illustrated as energized from a separate source of direct current 16 through a variable resistance means 17. In order to control dynamo-electric machine 10 in response to certain electrical conditions, I provide an electromagnetic device comprising a combined torque motor and switch 18. This torque motor and switch 18 comprises an electromagnet having a core member 19, a movable armature member 20, and an operating winding 21. Movable armature 20 is provided with a spring bias, tending to rotate the armature in a clockwise direction as viewed in Fig. 1. Rigidly attached to movable armature 20 is a radial arm 22 to the other end of which is pivotally mounted an insulating member 23. A spring biasing means, mounted between arm 22 and insulator 23, tends to rotate insulating member 23 in a counter-clockwise direction about the longitudinal axis of arm 22. To one end of insulator 23 is attached a conducting member 24 while to the other end of insulating member 23 is attached another conducting member 25. Conducting member 24 is arranged to contact either one of two fixed contact members 26 and 27 while conducting member 25 is arranged to contact either one of two conducting members 28 and 29, depending upon the position of arm 22 and associated armature member 20. A supply circuit from a source of direct current 30 for energizing the armature 14 of dynamo-electric machine 10 is provided, the positive terminal of which is connected directly to contacts 26 and 29, respectively. The negative terminal of direct-current source 30 is connected to contact 28 and also to contact 27 through a suitable variable resistance means 31, the purpose of which will be hereinafter described. One terminal of armature 14 of dynamo-electric machine 10 is connected through a variable resistance means 32 to conducting member 24 while the other terminal thereof is connected directly to conducting member 25. A source of electrical energy 33 is illustrated as connected across the electrode 12 and the work piece 13 so as to supply the necessary welding energy. Operating winding 21 of the combined electro-magnet and switch 18 is connected across the welding arc through variable resistance means 34, and variable resistance means 34 is so adjusted that arm 22 assumes an intermediate position between contacts 26, 28 and 27, 29 when a certain predetermined arc drop is obtained across electrode 12 and work piece 13. This control circuit and apparatus may be utilized in connection with electric de-seaming apparatus such as is disclosed and claimed in copending application Serial No. 225,389, filed August 17, 1938, by Richard F. Wyer, and assigned to the same assignee as the present application.

The operation of the control circuit and apparatus illustrated in Fig. 1 will be understood by those skilled in the art in view of the description given above but will be briefly described hereinafter. When no potential from source 33 is applied across electrode 12 and work piece 13, operating coil 21 of combined torque motor and switch 18 is deenergized and the spring-biasing means associated with armature 20 causes conducting members 24 and 25 to be moved to the left, thereby contacting members 26 and 28, respectively as shown in Fig. 1. As soon as the source of welding energy is connected across the electrodes, operating coil 21 is energized, causing conducting members 24 and 25 to move to the right against contact members 27 and 29 respectively. This connects the armature 14 of dynamo-electric machine 10 through resistances 31 and 32 across source 30 so as to rotate the armature 14 thereof in such a direction as to lower electrode 12. The positive terminal of direct-current source 30 is connected through contact 29 and conducting member 25, to the lower terminal of armature 14, while the negative terminal of source 30 is connected through resistance 31, contact 27 conducting member 24 and resistance 32 to the upper terminal of armature 14 of dynamo-electric machine 10. This arrangement causes rotation of dynamo-electric machine 10 in such a direction as to tilt electrode 12 downwardly toward work piece 13. The speed of rotation of this downward movement may be controlled by means of variable resistances 31 and 32. Since no arc has been struck at this time, the potential across operating coil 21 remains constant until electrode 12 contacts work piece 13, at which instant the potential across operating coil 21 drops to approximately zero thereby deenergizing the torque motor and causing the spring bias associated with armature 20 to move the arm 22 to the left as shown in Fig. 1 and cause conducting members 24 and 25 to contact contact members 26 and 28, respectively. This reverses the potential across armature 14 since the positive terminal of direct-current source 30 is now connected through contact 26, conducting member 24 and resistance 32 to the upper terminal of the armature 14 while the negative terminal of source 30 is connected through contact 28 and conducting member 25 to the lower terminal of armature 14. Since only variable resistance 32 is now connected in series with armature 14, the speed of the reverse direction of rotation of dynamo-electric machine 10 is different from and greater than the forward direction and electrode 12 is caused to tilt upwardly away from work piece 13. Electrode 12 continues to move away from work piece 13 until the predetermined arc voltage for which resistance 34 has been set is attained, at which time arm 22 assumes an intermediate position between contacts 26, 28 and 27, 29, respectively. At this time, the spring bias between arm 22 and insulating member 23 causes insulator 23 to rotate in a counterclockwise direction so that conducting member 24 moves against contact 26 and conducting member 25 moves against contact 29, thereby providing a dynamic braking circuit for dynamo-electric machine 10 through variable resistance means 32. This causes dynamo-electric machine 10 to stop, thereby holding electrode 12 at a predetermined distance from work piece 13 which is determined by the arc drop. As electrode 12 is used up, the arc drop increases, causing torque motor and switch 18 to operate in such a direction as to feed electrode 12 toward work piece 13, always tending to hold a constant arc drop across electrode 12 and work piece 13. As will be understood by those skilled in the art, such constant arc drop will be maintained by the vibratory action of the switch associated with the combined torque motor and switch 18; in other words, the connections for dynamo-electric machine 10 will not be changed directly from forward operation to braking or reverse operation, etc., as the electrode 12 is fed toward work piece 13 but this rate of feed will be controlled by making and breaking the armature circuit of dynamo-electric machine 10 between contacts 24 and 27. Hence, in this sense, the combined torque motor and switch 18 acts as a vibratory regulator for controlling the arc voltage and, consequently, the rate of feed of electrode 12.

In Fig. 2, I have illustrated combined torque motor and switch 18 in greater detail so as to show the spring bias associated with armature 20 and also the spring bias associated with arm 22 and insulating member 23. The corresponding parts of combined torque motor and switch 18 are characterized by the same reference numerals used in connection with Fig. 1. A coil spring 35 provides the bias between armature 20 and core 19, tending to move the armature in a clockwise direction. The spring bias between arm 22 and insulating member 23 is illustrated in Figs. 2 to 4 as a hairspring 36 tending to move insulating member 23 in a counterclockwise direction, referring to Fig. 4. Contact members 26 to 29 are illustrated as graphite conductors as are also conducting members 24 and 25 but it will be understood by those skilled in the art that any other kind of contacts or switch members may be used.

In Fig. 1, dynamo-electric machine 10 is illustrated as of the separately excited type of direct-current machine. It will be understood by those skilled in the art that other types of dynamo-electric machines may be used and, accordingly, in Fig. 5, I have illustrated my invention as applied to a series field type of dynamo-electric machine. The same reference numerals characterizing the various parts of Fig. 1 are utilized to characterize corresponding parts in Fig. 5. Dynamo-electric machine 10 is provided with an armature 14 and a series field 37. A variable resistance 38 is connected in shunt with armature 14 in order to control the speed of operation of dynamo-electric machine 10 and provide a dynamic braking circuit. When arm 22 is moved to the left, conducting members 24 and 25 make electrical contact with contact members 26 and 28, respectively, whereby the positive terminal of direct-current source 30 is connected through contact 26 and conducting member 24 to the upper terminal of armature 14 while the negative terminal of direct-current source 30 is connected through series field winding 37, contact 28, and conducting member 25 to the lower terminal of armature 14. In the opposite position, when insulating member 23 is moved to the right, the positive terminal of direct-current source 30 is connected through contact 29 and conducting member 25 to the lower terminal of armature 14 while the negative terminal of direct-current source 30 is connected through series field 37, contact 27, and conducting member 24 to the upper terminal of armature 14. In the intermediate position of pointer 22, the armature 14 is short circuited through the switch means and dynamically braked through resistance 38. The operation of the arrangement illustrated in Fig. 5 will be understood by those skilled in the art.

Although I have described my control circuit and apparatus as specifically applied to an automatic electric welding machine, it will be understood by those skilled in the art that my invention has many other applications since dynamo-electric machine 10 could be used to drive an induction voltage regulator or other apparatus where it is desired to drive an apparatus in the forward direction, in the reversed direction, or maintain it in the standstill position. It will be understood, therefore, that the particular apparatus driven by dynamo-electric machine 10 may be any suitable apparatus where the desired operating characteristics are obtained by means of the torque motor and switch provided by my invention.

While I have shown a particular embodiment of my invention used in connection with an automatic arc-welding machine, I do not desire my invention to be limited to the construction shown and described and I intend in the appended claims to cover all modifications within the spirit and scope of my invention.

What I claim as new and desire to secure by Letters Patent of the United States is:

1. In a system for controlling an electrical condition of a circuit, a reversible dynamo-electric machine, means driven by said dynamo-electric machine for controlling said electrical condition, an electromagnetic device having an armature biased to move in one direction and an operating winding connected to be responsive to said electrical condition and acting when sufficiently energized to move said armature in the opposite direction against said bias, a member pivotally attached at a point intermediate its ends to said armature, conductors electrically insulated from one another and extending crosswise of said member on opposite sides of its pivotal attachment to said armature, biasing means tending to rotate said member relatively to said armature, contacts located opposite each end of each of said conductors and spaced from one another more than the distance between the ends of said conductors, a supply circuit each of whose terminals is connected to diagonally opposite pairs of said contacts, and a circuit connecting said dynamo-electric machine with said conductors.

2. In a system for controlling an electrical condition of a circuit, a reversible dynamo-electric machine, means driven by said dynamo-electric machine for controlling said electrical condition, a torque motor having an armature spring biased for rotation in one direction and an operating winding connected to be responsive to said electric condition and acting when sufficiently energized to rotate said armature in the opposite direction against said spring bias, a radial arm attached to said armature, a member mounted for rotation about the longitudinal axis of said arm, spring biasing means tending to rotate said member about the longitudinal axis of said arm, conductors electrically insulated from one another and extending crosswise of said member on opposite sides of said arm, contacts located opposite each end of each of said conductors and spaced from one another more than the distance between the ends of said conductors, a supply circuit each of whose terminals is connected to diagonally opposite pairs of said contacts, and a circuit connecting said dynamo-electric machine with said conductors.

3. In a system for controlling an electrical condition of a circuit, a reversible dynamo-electric machine, means driven by said dynamo-electric machine for controlling said electrical condition, an electromagnetic device having an armature biased to move in one direction and an operating winding connected to be responsive to said electrical condition and acting when sufficiently energized to move said armature in the opposite direction against said bias, a member pivotally attached at a point intermediate its ends, to said armature, conductors electrically insulated from one another and extending crosswise of said member on opposite sides of its pivotal attachment to said armature, biasing means tending to rotate said member relatively to said armature, contacts located opposite each end of each of said conductors and spaced from one another more than the distance between the ends of said conductors, circuits connecting diagonally opposite pairs of said contacts, a supply circuit each of whose terminals is connected to diagonally opposite pairs of said contacts, a circuit connecting said dynamo-electric machine with said conductors, and two speed controllers for said dynamo-electric machine one of which is connected in one of said circuits connecting diagonally opposite pairs of said contacts and the other of which is connected in said circuit connecting said dynamo-electric machine with said conductors.

VERNI J. CHAPMAN.